United States Patent [19]

Pribis

[11] Patent Number: 4,490,013

[45] Date of Patent: Dec. 25, 1984

[54] ELONGATED PANORAMIC MIRROR DEFLECTOR

[76] Inventor: Milan Pribis, 83-45 Broadway, Elmhurst, N.Y. 11373

[21] Appl. No.: 370,287

[22] Filed: Apr. 20, 1982

[51] Int. Cl.³ .................... G02B 5/08; G02B 5/10; A47F 7/14; A47G 1/16
[52] U.S. Cl. .................... 350/632; 248/466
[58] Field of Search ............. 350/302, 307; 248/466, 248/467; D12/181, 182, 187, 188

[56] References Cited

U.S. PATENT DOCUMENTS

| | | | |
|---|---|---|---|
| 1,687,572 | 10/1928 | La Hodny | 350/307 |
| 3,671,110 | 6/1972 | Van Wassenhove | 350/307 |
| 3,773,406 | 11/1973 | Baumgardner et al. | 350/302 |

*Primary Examiner*—John K. Corbin
*Assistant Examiner*—Richard F. Gallivan

[57] ABSTRACT

An elongated panoramic mirror deflector consists of an elongated mirror located above and outside the windshield of an automobile for providing an unobstructed panoramic view toward the rear over the roof of the automobile. The elongated mirror extends the width of the windshield. The mirror is located so as to be visible to the driver along a line of sight which is at 45 degrees or less and is tilted at an angle of 70–80 degrees to the horizontal. The mirror is covered by a deflector which presents a curved surface to the airstream encountered by the automobile, thereby diminishing the aerodynamic drag of the mirror and, by diverting the airstream toward the body of the automobile, of the automobile as well. The elongated panoramic mirror deflector is attached to the rain gutters of the automobile by means of bars.

2 Claims, 6 Drawing Figures

ELONGATED PANORAMIC MIRROR DEFLECTOR

BACKGROUND OF THE INVENTION

My invention relates to an elongated panoramic mirror deflector.

SUMMARY

An object of the invention is to provide an automobile with a panoramic rear view without any obstructions and bypassing the view through the rear window that is very often foggy or not usable in the rain. Using the upper rear mirror and both side rear mirrors distracts the attention of the driver and does not give a complete rear view situation. When driving in the city or in heavy traffic on the highway, besides the traffic ahead, the driver must look in the mirror located over his head, then into the left side rear mirror, sometimes into the right rear mirror and, to be absolutely safe, he must turn his head to see the traffic behind his car. The invention enables the driver to see the whole unobstructed panoramic view behind his automobile through the upper margin of his windshield glass, the area that used to be tinted, by just looking a little bit up and straight ahead. Using the invention improves the safety of automobile driving.

Another object of the invention is that the deflector diminishes the added aerodynamical drag of the mirror and the drag of the whole automobile by directing the airstream closer to the body of the automobile and thereby improves the mileage.

In the accompanying drawings I show complete examples and schematic diagrams of the physical embodiments of my invention devised to illustrate in a simple manner the practical application of the principles of my invention. It should, however, be understood that changes may be made within the scope of what is claimed without departing form the spirit of the invention.

DETAILED DESCRIPTION OF THE PREFERRED EMBODIMENT

Figure 1:
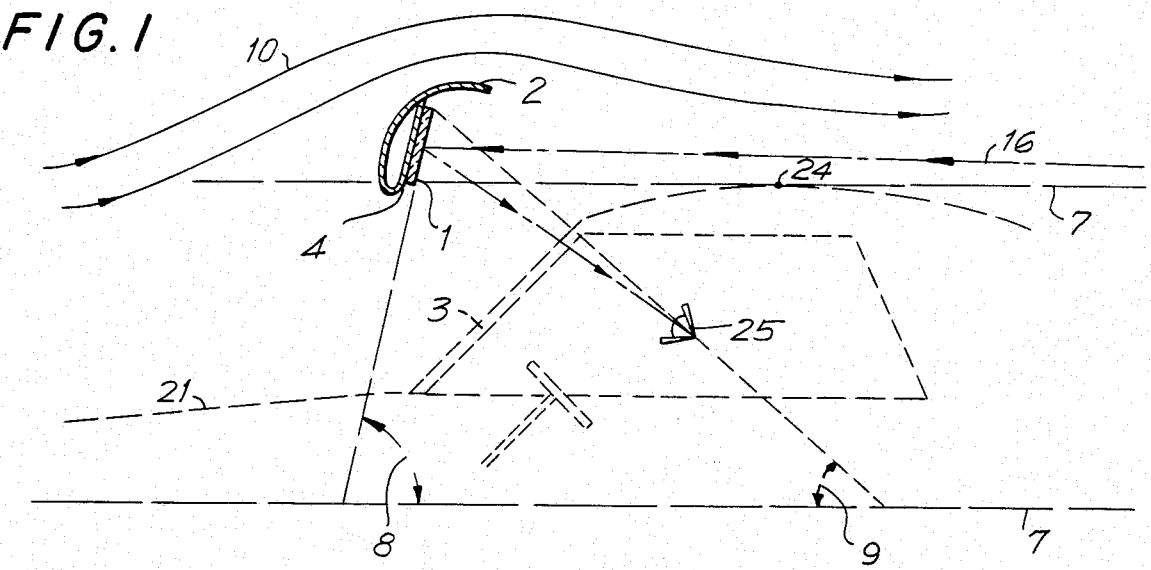
FIG. 1 is a schematic diagram-side view of an elongated panoramatic mirror deflector form of the invention.
Figure 2:
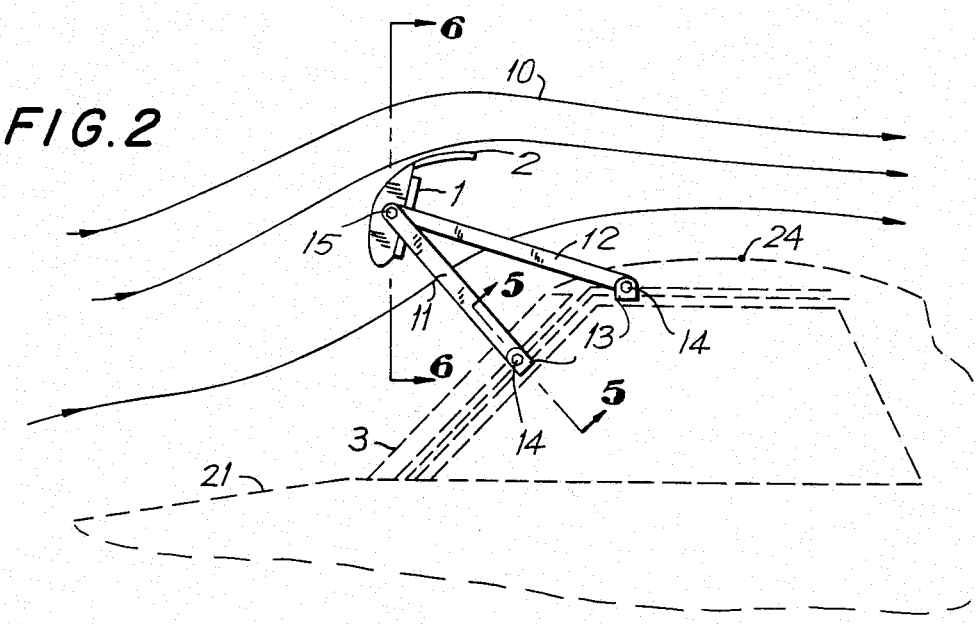
FIG. 2 is a side view of the invention fixed to the body of an automobile.
Figure 3:
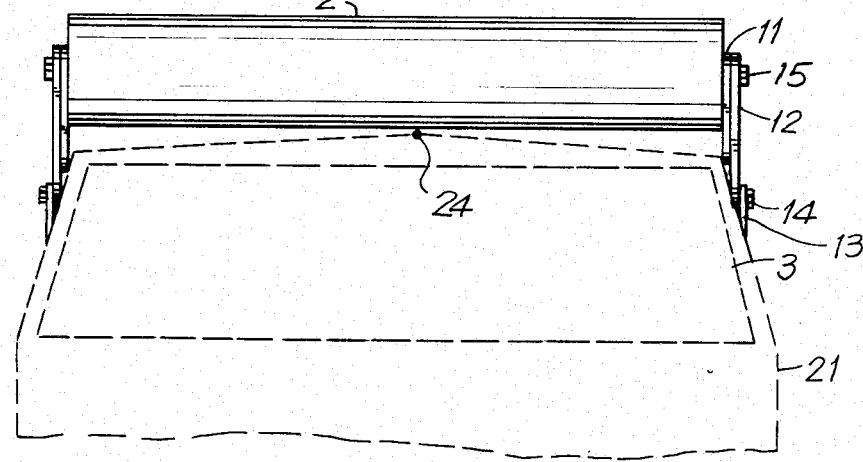
FIG. 3 is a front view of the invention fixed on the body of an automobile.
Figure 4:
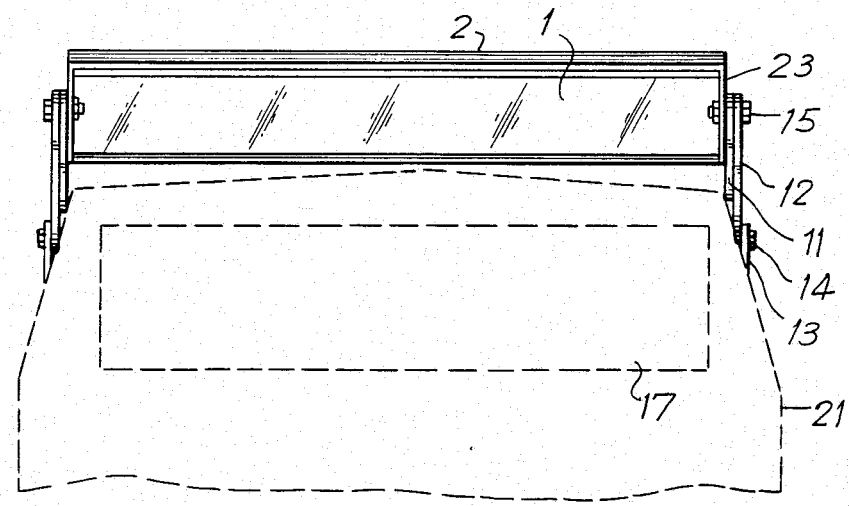
FIG. 4 is a rear view of the invention fixed on the body of an automobile.
Figure 5:
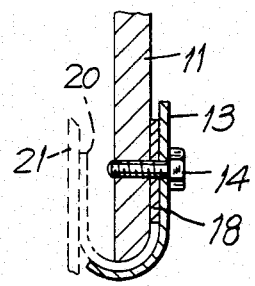
FIG. 5 is a cross section along line 5—5 of FIG. 2.
Figure 6:
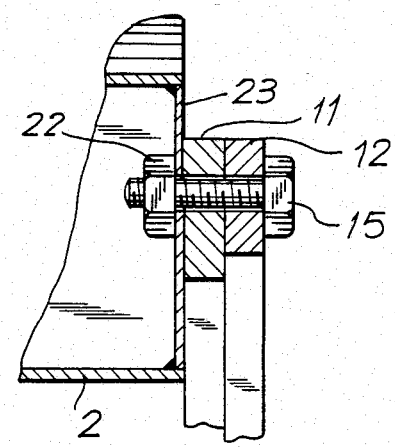
FIG. 6 is a cross section along line 6—6 of FIG. 2.

In these views, numeral 1 designates the usual elongate panoramic mirror, 2 is the deflector, 3 is the windshield of the body of an automobile 21, adhesive 4 is holding together mirror 1 and deflector 2.

The function of the invention is tied to the positioning of the mirror 1, that is determined by locating its lower edge to touch the imaginary horizontal plane 7 resting on the highest point of the automobile roof 24 and the upper edge of the mirror 1 should be seen through the upper edge of the windshield 3 at angle 9 that is 45 degree or less against horizontal plane 7.

The mirror 1 with deflector 2 is adjustable by fixing the side wall 23 with bolt 15 and nut 22 to the windshield bar 11 and roof bar 12 at angle 8 that is approximately 70–80 degrees. The windshield bar 11 is fixed to the body of the automobile 21 and rain drip gutter 20 by bolt 14 tied over hook bar 13 and washer 18. The roof bar 12 is fixed in the same manner to the rain drip gutter 20 on the roof of the automobile.

The undisturbed panoramic view is achieved so that the optical axis 16, that has a small angle below horizontal plane 7, reflected from elongated panoramic mirror 1 is projected through windshield 3 into the driver's eye 25. The rear window 17 is shown for reference only.

The air streamlines 10 are directed toward the body of the automobile 21 by deflector 2, thereby lowering aerodynamical drag and improving mileage.

What I claim is:

1. An elongated panoramic mirror deflector for an automobile positioned in front of the windshield comprising: A mirror whose lower edge is resting on an imaginary horizontal plane that touches the highest point of the roof of said automobile, the upper edge of said mirror being visible to the driver's eye through the windshield of said automobile along a line of sight at an angle of 45 degrees or less to the horizontal, said mirror being positioned such that its plane is at an angle of 70–80 degrees to the horizontal so that an optical axis passing over the roof of said automobile is reflected from said mirror through the windshield into the driver's eye, said mirror extending substantially the entire width of said windshield; a deflector comprising a sheet of material having a flat portion attached to the rear side of said mirror opposite said windshield and said driver and a curved portion extending from the bottom of said flat portion and being folded up, around and over said flat portion and said mirror so as to form a convexly curved shape facing the direction of travel of said automobile thereby diminishing the aerodynamic drag of said mirror and, by diverting the airstream toward the body of said automobile, lowering the total drag and improving the milage of said automobile.

2. The elongated panoramic mirror deflector according to claim 1, further being fixed into position by bars being fastened into the rain gutters of said automobile.

* * * * *